N. Q. KELSO.
BROODER.
APPLICATION FILED SEPT. 25, 1913.
1,110,941.
Patented Sept. 15, 1914.
2 SHEETS—SHEET 2.
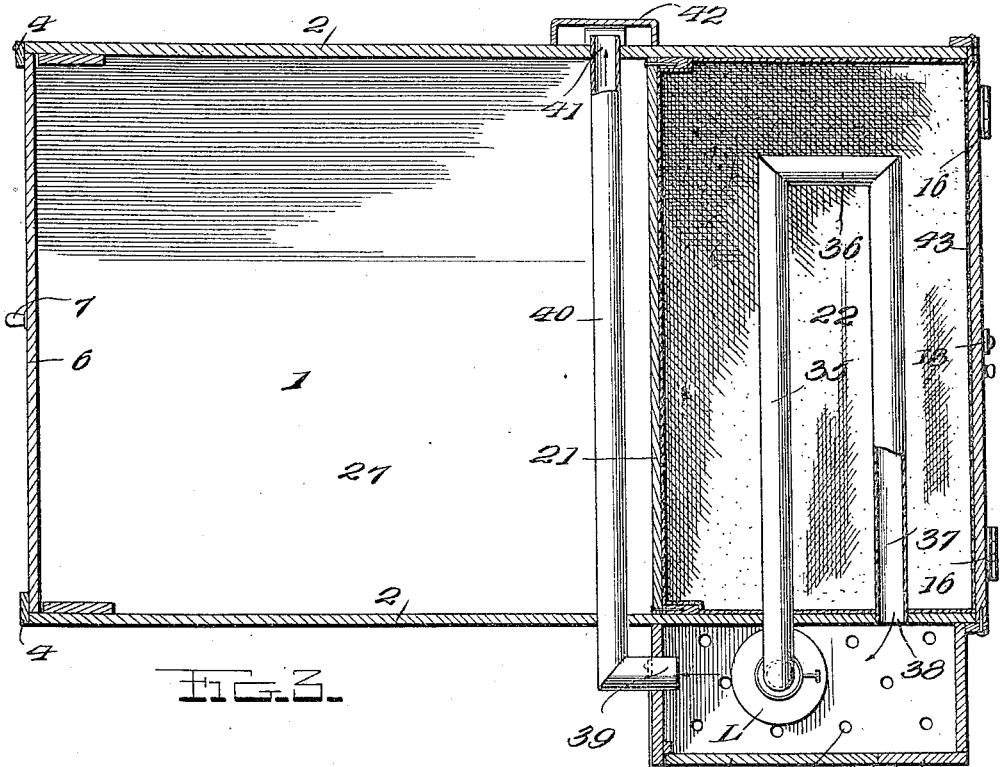
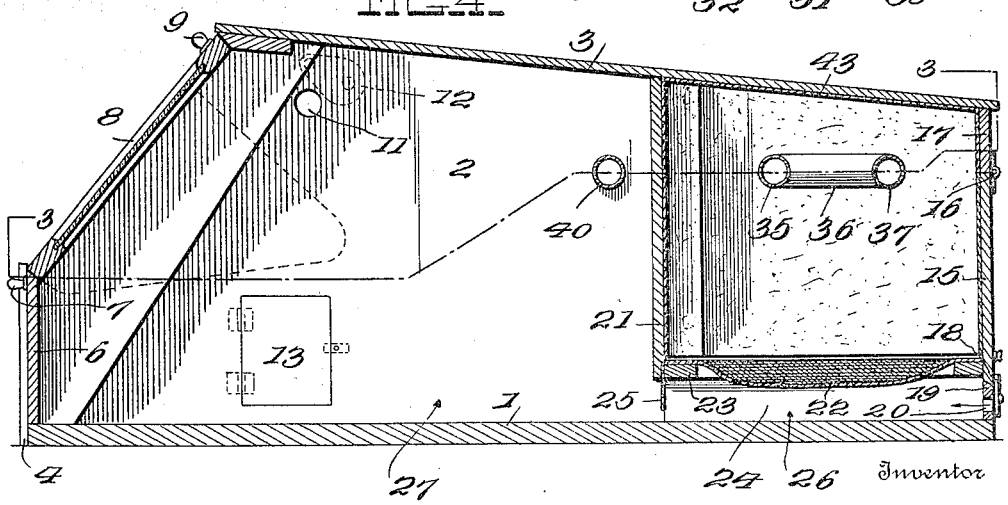
Witnesses
Inventor
N. Q. Kelso.
By H. B. Willson & Co. Attorneys

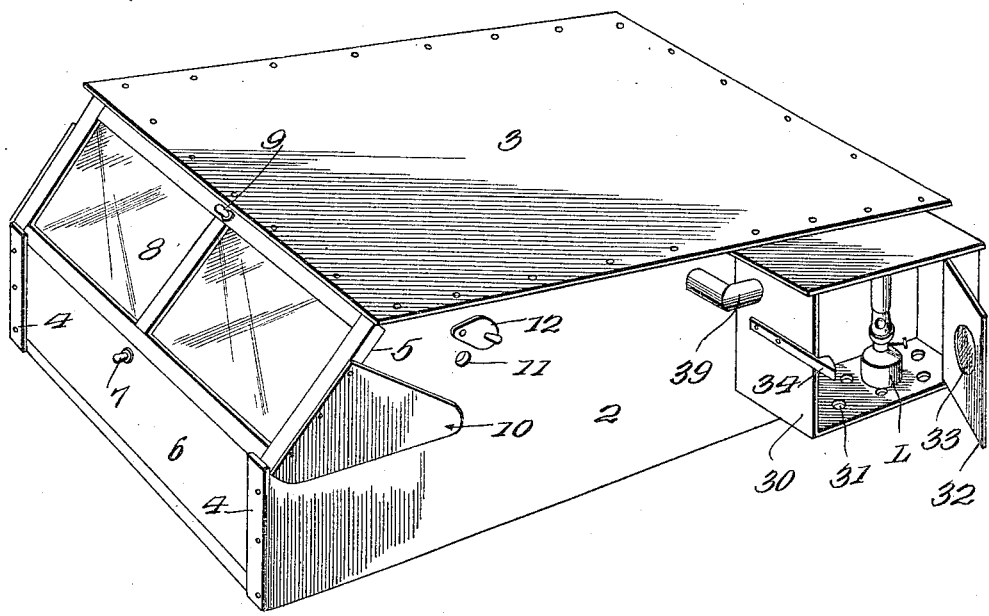
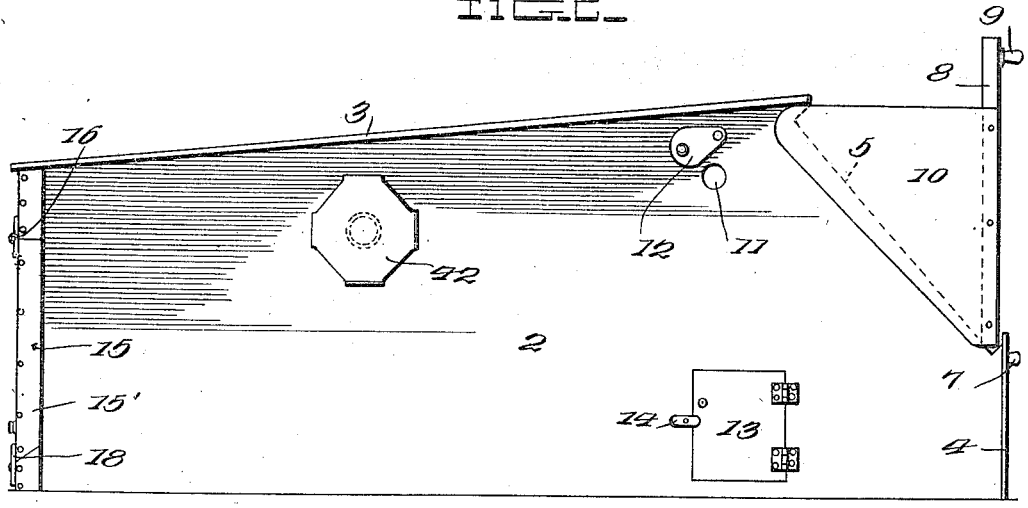

UNITED STATES PATENT OFFICE.

NYLA Q. KELSO, OF TULSA, OKLAHOMA, ASSIGNOR OF ONE-HALF TO JOHN D. WYNN, OF TULSA, OKLAHOMA.

BROODER.

1,110,941.
Specification of Letters Patent.
Patented Sept. 15, 1914.

Application filed September 25, 1913. Serial No. 791,838.

*To all whom it may concern:*

Be it known that I, NYLA Q. KELSO, a citizen of the United States, residing at Tulsa, in the county of Tulsa and State of Oklahoma, have invented certain new and useful Improvements in Brooders; and I do declare the following to be a full, clear, and exact description of the invention, such as will enable others skilled in the art to which it appertains to make and use the same.

This invention relates to animal husbandry, and more especially to brooders; and the object of the same is to improve the details of construction of a device of this character.

To this end the invention consists in the specific construction of parts as hereinafter more fully described and claimed and as shown in the drawings wherein—

Figure 1 is a perspective view of this brooder complete, Fig. 2 is a side elevation thereof, Fig. 3 is a horizontal section taken about on the line 3—3 of Fig. 4, and Fig. 4 is a central vertical longitudinal section.

In the drawings the numeral 1 designates the base, from which rise two sides 2 overlaid for the most part by a top 3 which by preference slopes gently to the rear as shown. At their front ends the sides 2 rise vertically for a distance and carry cleats 4, and from a point slightly below the upper ends of said cleats the front ends of the sides 2 are inclined rearwardly as shown at 5, with the result that the top 3 is shorter than the base 1. Behind the cleats is slidably mounted a front panel 6 which is rendered removable by means of a handle 7, and resting on the incline 5 is a sash 8 also by preference having a handle 9, the ends of this sash carrying wings 10 of galvanized iron and shaped about as shown in Figs. 1 and 2 so that when the sash is thrown upward as seen in the last-named view the extremities of said wings will strike beneath the front edges of the top 3 and prevent the sash from opening too far unless it is lifted out of place by its handle 9. When closed this sash admits light and heat, when opened as shown in Fig. 2 it admits air as well as light and heat but the wings 10 prevent wind from blowing on the tender chicks or the chicks from jumping out, and when lifted out of place the front end of the brooder is open except for the front panel 6 which confines the chicks until they are large enough to jump over it. This panel can also be lifted out of place when it is desired to clean the floor or base 1. The sides 2 are provided with ventilation openings 11 covered by movable closures 12, and one side may carry a hinged door 13 held closed by a button 14 or like device. A comparatively large door 15 closes the rear end of the casing, and is by preference hinged at 16 along its upper edge to a strip 17 which is secured to the sides 2, its lower edge being held closed by a button 18 or similar device mounted on a lower cross strip 19 as seen in Fig. 4. The rear door I would provide with end flanges 15' so that it will close air-tight or as nearly so as possible, but the strip 19 is provided with fine fresh air inlet openings 20. Across the interior of the casing thus constructed is built a partition 21 reaching from the top of the sides 2 downward to a point near the bottom 1, and this partition and the two sides, the top 3, and the large rear door 15 make up the walls of a "heating chamber" so called, the bottom of the same being a removable hover cloth 22, preferably woolen, mounted in a frame 23 and resting removably upon cleats 24 extending along the inner faces of the sides 2 as best seen in Fig. 4. This cloth I would make rather loose in its frame so that its own weight will cause it to sag and rest gently upon the chicks beneath, and its front edge I would carry over the forward bar of the frame and allow to hang loosely as shown at 25 so as to constitute a curtain dividing the "hover chamber" 26 from the larger and what I call "scratching chamber" 27 forward of the partition. The entire hover cloth and its frame can be removed out of the large rear door when desired.

While any suitable source of heat may be employed, I have shown an ordinary kerosene lamp L as mounted within a box 30 having perforations 31 in its bottom for the admission of air to the lamp and a hinged door 32 having a glass panel 33 and held closed by means of a catch 34, so that access to the lamp may be had. This box I would dispose entirely outside the casing of the brooder proper and near its rear end, and the flue from the lamp which carries the products of combustion I pass through the adjacent side wall of the brooder and longitudinally along the heating chamber as seen at 35, then across the far end of the same as at 36, thence again back throughout the heating chamber as at 37 and into the box 30 as at 38, whereas the outlet flue leads from said box at 39 and passes directly across the scratching chamber as at 40, through both walls of the casing, and out the far or remote wall at 41 where it is covered or protected as at 42 to prevent wind from blowing into this end of the flue. When now the lamp is lighted, the heat passes out of the box 30 and throughout the course indicated by the numerals 35, 36, and 37 within the heating chamber which is thereby warmed without receiving any of the products of combustion. The latter flow out of the flue at the point 38, across the interior of the box 30 at its upper side, and out at the point 39 whence they flow across the interior of the scratching chamber 27 at 40 without getting into the same at all, and pass into the open air at the point 41. Thus it will be seen that I utilize the radiation from the flue within the heating chamber to heat the latter, and the radiation from the flue across the scratching chamber to heat that; but I take care that the products of combustion have no chance to get into the interior of the brooder in any way and in fact I locate the entire heating plant outside the brooder casing and warm the interior of the latter only by radiation from its flues. For this reason said flues should be made of rather thin sheet metal which is a good conductor of heat, although I would not be limited in this respect. It will be observed from Fig. 4 that the heat is radiated into the upper part of the heating chamber directly above but some distance away from the hover cloth 22, and the interior of this chamber I prefer to line with felt paper as indicated at 43, which serves as a heat insulation and to render the upper part of the heating chamber substantially air-tight. The hover cloth itself constitutes the bottom of the chamber, and the result will be that the heat in the latter will heat the cloth and the cloth by resting on the backs of the chicks will heat the chicks in simulation of the natural heat of a hen's body, yet the heat will be rather confined in the chamber 26 by the curtain 25.

In the scratching chamber 27 may be placed food, water, and fine sand, and in fact I would cover the entire base 1 of this portion of the brooder with dirt which the chicks may scratch. The door 13 is obviously useful as an outlet when the chicks grow large enough to run about during the day time, but the larger rear door 15 is for the purpose of permitting the user to reach in and withdraw the hover cloth and its frame entirely when he seeks to gain access to the chicks themselves at night.

The casing is by preference made entirely of wood excepting for the hardware parts, but the closures 12, the wings 10, and possibly the flanges 15' may be of sheet metal as well as the protector 42 and the flues.

The uses of brooders are too well known to need elaboration here.

What is claimed as new is:

A brooder comprising a casing, a partition wall therein dividing the casing into a heating and a scratching chamber, a heater box applied to one side wall of the casing, a source of heat within said box, a flue leading from said source through the adjacent wall of said casing to the heating chamber and returning to terminate in the last mentioned side wall, whereby to return the products of combustion to said box after heating said heating chamber, and a second flue leading from said heater box through the adjacent side wall of the casing to extend transversely across the scratching chamber, the opposite and outer end of said last mentioned flue terminating in the opposite side wall of the casing.

In testimony whereof I have hereunto set my hand in presence of two subscribing witnesses.

NYLA Q. KELSO.

Witnesses:
FRED D. OILER,
H. T. GIRD.

---

Copies of this patent may be obtained for five cents each, by addressing the "Commissioner of Patents, Washington, D. C."